United States Patent [19]

Wahl, III

[11] 4,272,960
[45] Jun. 16, 1981

[54] PROCESS AND SYSTEM FOR RECOVERY OF WORKING FLUID FOR DIRECT CONTACT HEAT EXCHANGE

[75] Inventor: Edward F. Wahl, III, Claremont, Calif.

[73] Assignee: Occidental Petroleum Corporation, Los Angeles, Calif.

[21] Appl. No.: 875,213

[22] Filed: Feb. 6, 1978

[51] Int. Cl.³ .................................................. F03G 7/00
[52] U.S. Cl. .................................... 60/641 D; 60/649; 60/641 F; 202/233; 203/85; 203/DIG. 20
[58] Field of Search .......................... 60/641, 649, 673; 165/45; 203/88, 96, 100, 25, 27, 85, DIG. 20; 202/233

[56] References Cited

U.S. PATENT DOCUMENTS

| | | | |
|---|---|---|---|
| 2,113,130 | 4/1938 | Dunham | 203/96 |
| 2,520,006 | 8/1950 | Hibshman et al. | 203/96 X |
| 3,414,482 | 12/1968 | Folz | 203/100 X |
| 3,988,895 | 11/1976 | Sheinbaum | 122/31 R |
| 4,089,175 | 5/1978 | Woinsky | 60/641 |
| 4,163,697 | 8/1979 | Michaux | 203/88 |

Primary Examiner—Allen M. Ostrager
Assistant Examiner—Stephen F. Husar
Attorney, Agent, or Firm—Max Geldin; Barry A. Bissom

[57] ABSTRACT

In the recovery of energy from geothermal brines and other water containing or hot water sources, such brine or hot water under pressure is introduced into direct heat exchange contact with a working fluid such as isobutane, the resulting hot isobutane is expanded in a turbine to produce work, the turbine discharge is condensed and returned to the heat exchanger and the cooled brine is withdrawn from the column. The present invention is directed to recovery of working fluid dissolved and/or entrained in the spent geothermal brine or water withdrawn from the direct contact heat exchanger, including the steps of settling the brine in a settling tank to recover some of the isobutane, flashing the remaining brine to flash off additional isobutane and steam stripping the spent brine to drive off further isobutane, the recovered isobutane in each of the steps being recycled to the direct contact heat exchanger.

6 Claims, 2 Drawing Figures

PROCESS AND SYSTEM FOR RECOVERY OF WORKING FLUID FOR DIRECT CONTACT HEAT EXCHANGE

BACKGROUND OF THE INVENTION

This invention relates to the recovery of working fluid entrained in the spent geothermal brine or other hot water source withdrawn from a direct contact heat exchanger in which heat is transferred from the brine or hot water to the working fluid, and is particularly concerned with a process and system of the aforementioned type, including removal of the working fluid contained in the spent geothermal brine or hot water source, by a series of successive steps or operations, whereby the final spent brine or water removed from the system is substantially free or has a very small concentration of remaining working fluid, and wherein the working fluid so recovered is recycled to the direct contact heat exchange column.

U.S. Pat. No. 3,988,895 and applications Ser. Nos. 589,068, filed June 23, 1975, and 836,293, filed Sept. 26, 1977, by Samuel G. Woinsky, disclose recovery of energy from geothermal brine by passing such geothermal brine under pressure into direct heat exchange contact with a working fluid such as isobutane, expanding the resulting hot working fluid or isobutane in a turbine to produce work, condensing the turbine discharge, and returning the resulting condensed working fluid to the heat exchanger, and withdrawing the spent brine from the column and discarding same as by introducing the spent brine into a brine injection well.

However, dissolved and entrained working fluid usually exits the direct contact heat exchanger with the spent brine or water. If such spent brine or water containing working fluid is pumped into a rejection well or otherwise disposed of, the cost of the lost working fluid can be significant. An important consideration both for environmental and economic reasons accordingly is the recovery of the working fluid from the spent brine or hot water before discarding such brine or water, or before reinjection of spent brine into a brine injection well.

Above U.S. Pat. No. 3,988,895 discloses the step of removing entrained working fluid from the spent brine in a separator, followed by flashing off additional working fluid from the spent brine.

Above Woinsky application Ser. No. 836,293 also discloses recovery of working fluid from the spent brine in a direct contact heat exchange process and system, including removal of entrained working fluid in a separator followed by flashing off additional entrained working fluid from the spent brine.

The paper "Direct Contact Heat Exchangers in Geothermal Power Production" by I. Sheinbaum, presented at the AICHE-ASME Heat Transfer Conference, San Francisco, Cali., Aug. 11-13, 1975, suggests vacuum stripping or gas stripping of the spent hot water for recovery of working fluid. However, the use of such stripping operation requires a substantial amount of energy for removal of the dissolved and entrained working fluid.

Thus, the particular systems suggested or disclosed by the prior art for removing dissolved and/or entrained working fluid from spent brine or hot water in direct contact heat exchange processes and systems, have not been satisfactory for removing substantially all of the working fluid from the spent brine or hot water, prior to discarding same from the system, or have required the use of a substantial amount of energy for this purpose.

Accordingly, one object of the present invention is the efficient removal and recovery of working fluid entrained and/or dissolved in the spent geothermal brine or hot water withdrawn from a direct contact heat exchanger used for recovery of energy from such geothermal brine or hot water. Another object is the provision of an economical process and system of the above type, including subjecting the spent brine or hot water from the direct contact heat exchanger to a series of successive operations or steps, for removal of substantially all of the entrained working fluid from the spent brine or hot water and for recycling of such recovered working fluid to the direct contact heat exchanger. A still further object of the invention is the carrying out of such operations or steps for recovery of working fluid contained in the spent brine or hot water, with a minimum energy expenditure.

SUMMARY OF THE INVENTION

In the basic direct contact heat exchange system for recovery of energy from geothermal brine or other water containing or hot water sources, the geothermal brine from a well or other hot water containing source, is introduced under pressure into a heat exchanger in direct heat exchange contact with an immiscible working fluid such as isobutane. The resulting hot working fluid is expanded in an expander or turbine to produce work, and the expanded working fluid discharged from the turbine is condensed and the condensed working fluid is returned to the heat exchanger. The cooled brine containing some entrained and/or dissolved working fluid is withdrawn from the heat exchange column.

According to the invention for recovery of such entrained and/or dissolved working fluid from the spent cooled brine or water, the latter is subjected to a series of successive steps or stages, thereby removing a portion of the working fluid in each of such operations. Thus, the spent brine or water is first passed to a settling tank to separate and recover some of the immiscible working fluid, the resulting spent brine or water is then flashed in a flash drum, to further reduce the working fluid content of the spent brine or water, and the spent brine or water is then subjected to steam stripping for still further reducing the working fluid content of the spent brine or water. The steam stripping stage or step results in removing substantially all or the major portion of the remaining working fluid content from the spent brine or water.

The recovered working fluid in each of the above three stages or operations is collected and recycled to the direct contact heat exchanger. If the spent brine or hot water leaving the direct contact heat exchange column is at sufficiently high pressure, energy can be recovered between the above noted first and second stages of working fluid recovery, by a work expander or power recovery turbine.

In the first stage of working fluid recovery noted above, the use of a settling tank for the spent brine will recover some of the dissolved and/or entrained working fluid such as isobutane, in liquid form. Reducing the pressure in the settling tank will lower the solubility of the working fluid in the spent brine or hot water, and allow greater recovery of liquid working fluid. Such liquid working fluid can be recycled directly to the direct contact heat exchange column.

The second stage which comprises flashing the resulting spent brine or water, involves dropping the pressure of the solution to the pressure of the condenser used in condensing the working fluid discharged from the turbine in the basic process, so that the working fluid, e.g. isobutane, will boil from the solution and flow overhead to the condenser for recovery therein, followed by passage of the condensed working fluid back to the direct contact heat exchanger. The only energy required in this step is for boiling the working fluid, and this is provided by the hot solution itself.

Following the above flashing of the brine or water, the resulting spent brine or hot water is subjected to steam stripping for further working fluid recovery. In this operation, the spent brine or water containing the working fluid enters the top of the stripping column while steam flowing upwardly in the column carries working fluid out of the top of the column. The steam for such stripping can be generated by using the heat of the spent brine or hot water, and if desired, by additional use of some hot wellhead brine, external steam or other heat source for this purpose. The mixture of working fluid and steam which is carried from the top of the stripper is condensed, the gaseous working fluid is separated from the condensed steam and is returned to the condenser for the working fluid discharged from the turbine in the basic process, for recycling to the direct contact heat exchanger.

Thus, there is provided an efficient and economical process and system for removal of the working fluid from the spent brine or hot water discharged from the direct contact heat exchanger, by successive settling, flashing and steam stripping operations, suitably arranged and designed so as to efficiently recover the major content of the working fluid from the less volatile spent geothermal brine or water solution, utilizing a minimum amount of energy for this purpose.

THE DRAWING

The above and other features and advantages of the invention will be more clearly understood by reference to the following detailed description of the invention, taken in connection with the accompanying drawing wherein:

FIG. 1 is a schematic flow diagram of the basic direct contact heat exchange power generation system employing direct contact heat exchanger; and FIG. 2 is a schematic flow sheet of one preferred embodiment of the invention for recovery of working fluid from spent geothermal brine removed from the direct contact heat exchanger of FIG. 1.

DESCRIPTION OF PREFERRED EMBODIMENTS

Figure 1:
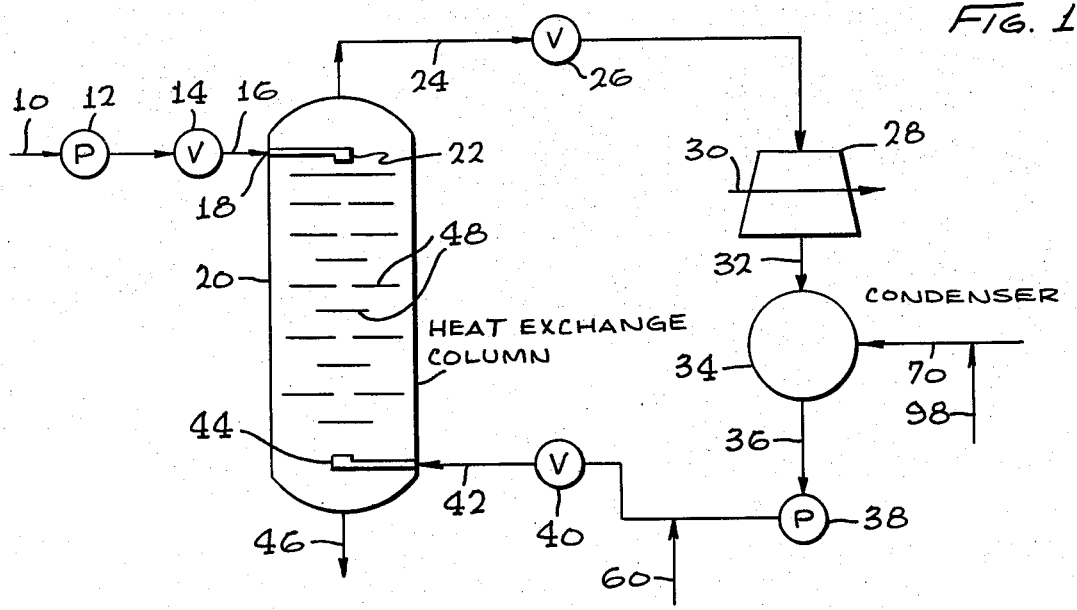

Referring to FIG. 1 of the drawing, geothermal brine or hot water which may be degassed to partially remove non-condensible gases, enters through inlet means or conduit 10 and is passed to pump 12 which discharges via valve 14 and conduit 16 into an inlet 18, from which the hot water or brine is discharged into the top of the heat exchanger column 20 in direct contact heat exchange with a working fluid. Such working fluid can be any suitable material which is immiscible with water, and such working fluid can have a density less than or greater than the density of the hot water containing fluid or brine, provided that the same density relation exists along the length of the column, so as to provide countercurrent flow of working fluid and water-containing fluid such as brine in the column.

Thus, the working fluid can be a hydrocarbon including aromatics, paraffins, naphthenes and olefins. Preferably, the working fluid is a paraffin or olefinic hydrocarbon containing from about 1 to about 8 carbon atoms, either straight or branched chain such as methane, ethane, propane, n-butane, isobutene, n-pentane, isopentane, neopentane, (2,2-dimethyl-propane), n-hexane, cyclohexane, n-heptane, n-octane, isooctane, and the analogous olefins such as n-butene, isobutene, and the like. Most desirably, paraffinic or olefinic hydrocarbons containing from about 3 to about 6 carbon atoms are employed. Aromatic hydrocarbons such as benzene, toluene, and xylene also can be used.

Mixtures of such hydrocarbons can also be utilized, such as, for example, a mixture of methane and ethane, ethane and propane, or propane and n-butane, to optimize the critical temperature and pressure conditions of the working fluid, and thereby obtain maximum energy recovery from the geothermal brine or hot water feed.

Working fluids other than hydrocarbons are also suitable provided they at least have the proper density relation to the hot aqueous fluid or brine as noted above and are immiscible.

A particularly preferred working fluid is isobutane.

Inlet temperature of the hot water or brine to the top of the column ranges from about 150° to about 600° F., with a range of about 300° to about 500° F., e.g. about 400° F., being customary for hot geothermal brine. Although the heat exchange column 20 can be operated above, or below, or at the critical conditions of the working fluid, in one embodiment the heat transfer column is operated above the critical pressure of the working fluid in the top of the column, such pressure preferably ranging from about 450 psia, to about 1,000 psia., usually from about 500 to about 700 psia. The working fluid is heated in heat exchange column 20 by direct contact with the incoming hot brine or hot water. For this purpose an inlet nozzle 22 can be provided at the top of the column, for directing the hot brine or hot water downwardly into the column.

As described in greater detail below, in the system illustrated in FIG. 1, the working fluid passing upwardly in the column from the bottom thereof, countercurrent to the flow of feed brine or water, causes heat to be transferred from the hot brine to the cold working fluid, and the hot working fluid in the top of the column is passed through conduit 24, via valve 26, to a work expander 28, where the heated working fluid expands to produce work which is transferred through shaft 30, e.g. to an electric generator. The discharged expander working fluid is then passed via conduit 32 to a cooler or condenser 34, and the condensed working fluid is then removed through line 36 and pump 38 to pressurize the working fluid approximately to the pressure in the heat exchanger column 20 and the pressurized fluid is then fed via valve 40 and conduit 42 to the inlet 44, through which the cold working fluid is introduced into the bottom of the heat exchanger column 20, to be reheated therein. Cooled brine or water in the bottom of the heat exchange column is discharged at 46.

The heat transfer column 20 can be of any conventional type such as one containing dual flow trays or sieve plates, as indicated schematically at 48, to provide efficient heat transfer between the hot brine or water and the working fluid.

Figure 2:
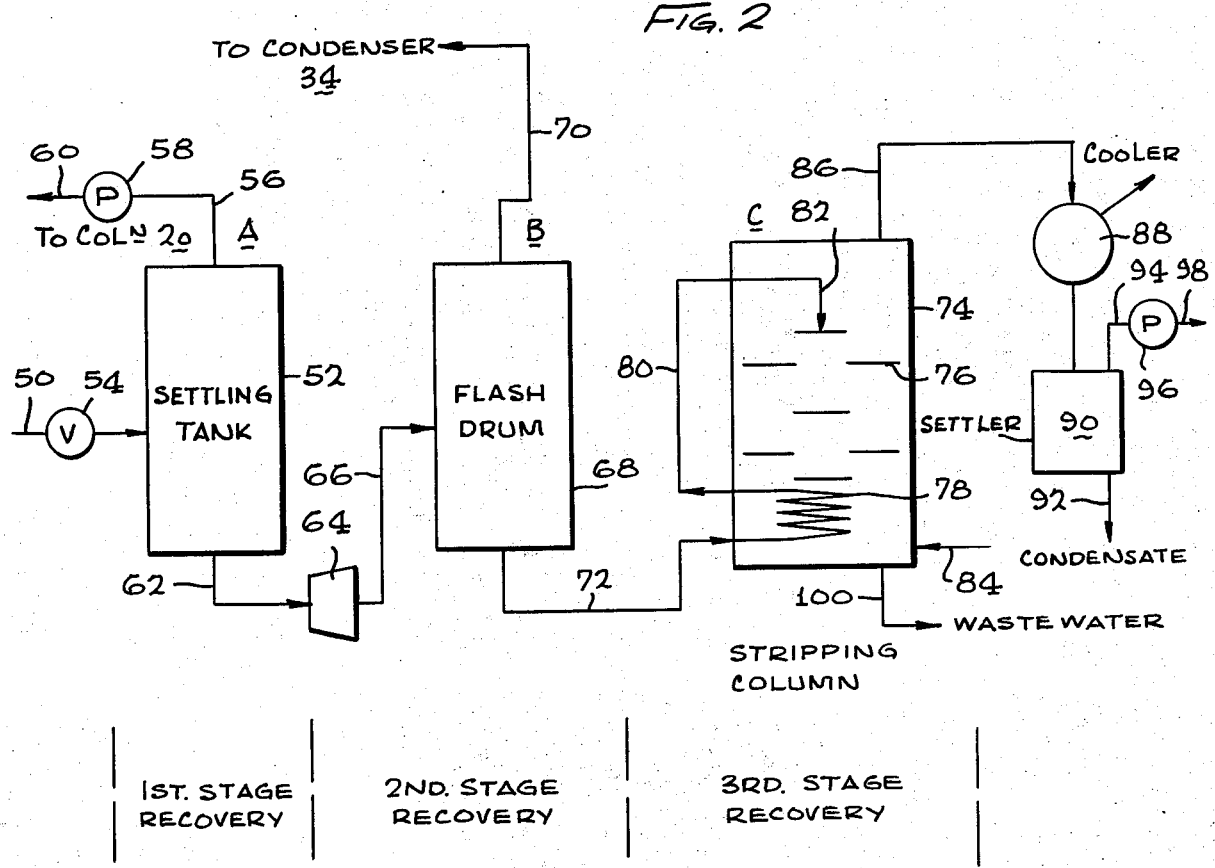

Referring now to FIG. 2, the cooled brine or water discharged at 46 from the heat transfer column, and which is still hot or at elevated temperature, is fed via line 50 to the first stage A for recovery of dissolved and/or entrained working fluid, e.g. isobutane, in the discharged brine or water. Such first stage of the working fluid recovery process and system of the invention comprises settling of the brine or water in a settling tank 52 for recovery of a portion of the working fluid in liquid form. For this purpose it is preferred to lower the pressure of the brine or water by passage thereof first through a throttling valve 54 prior to introduction into the settling tank 52, to lower the solubility of the working fluid in the brine or water, and permit greater recovery of the working fluid in liquid form. Instead of a throttling valve, a work expander or turbine can be employed to reduce the pressure of the brine or water, and at the same time recover useful energy.

The liquid working fluid withdrawn from the settling tank 52 at 56 is pumped at 58 up to the pressure in the heat transfer column 20 and is returned via line 60 and conduit 42 (FIG. 1) to the heat transfer column 20.

The brine or water in the settling tank 52 is discharged at 62 and fed to a turbine 64 for recovery of power, while dropping the pressure of the discharged brine or water at 66 to the pressure in the condenser or cooler 34 (see FIG. 1). The brine or water in line 66 is introduced into the second stage B of the working fluid recovery process and system of the invention, which comprises a flash drum 68. Additional working fluid, e.g. isobutene, entrained and/or dissolved in the brine or water is boiled from the solution in flash drum 68 and flows overhead via conduit 70 and is introduced into the condenser 34 (see FIG. 1). The only energy required in this stage is for boiling the working fluid, and such energy is provided by the hot solution itself.

The brine or water discharged from the flash drum 68 is passed via line 72 to the third stage C of the invention working fluid recovery system and process. Such third stage comprises a stripping column 74 of conventional type, containing a plate system as indicated at 76, the brine or water at 72 being introduced through a coil 78 in the lower portion of the stripper 74 in indirect heat exchange with the lower portion of the stripper, and then passed via conduit 80 to an inlet 82 in the top of column 74. The brine or water containing the working fluid thus enters the top of the column and flows down across the plates 76 or equivalent contacting devices.

The steam for the stripping operation can be generated by the brine or water passing through coil 78. However, if desired, wellhead brine or steam or other heat source can be introduced at 84 into the stripper 74 to provide the heat drive for operating the stripper. Steam flows upwardly through the stripper 74, with a mixture of steam and working fluid being carried out of the top of the column at 86. Such mixture is then conducted to a cooler or condenser 88, from which the condensed liquid is passed to a settler 90. The condensed steam or water is discharged at 92, and the working fluid in gaseous form discharged from the settler 90, is conducted via line 94 to a pump 96, to pump the working fluid up to the pressure in condenser 34 (see FIG. 1), and the resulting working fluid is conducted via conduit 98 into conduit 70 (see FIG. 1) for introduction into the condenser 34.

The waste brine or water is discharged at 100 from the third stage stripper 74, and is discarded by passage to a sump or to a brine injection well (not shown). The brine or water thus discharged at 100 has a very low working fluid content, and can be considered to be substantially free of any recoverable amount of working fluid.

In a specific example of operation of the working fluid recovery process and system of the invention, as illustrated in FIGS. 1 and 2, spent brine containing isobutane working fluid withdrawn at 46 from the direct contact heat transfer column 20, and at a temperature of 190° F., and at a pressure of 600 psia., is passed to a settling tank. Isobutane working fluid dissolved and/or entrained in the brine settles as a liquid immiscible with the brine, in the settler and is withdrawn and pumped up to 600 psia., the pressure in the direct contact heat transfer column as at 20 in FIG. 1, and is recycled to the column.

The brine withdrawn from the settling tank is introduced as feed into a power recovery turbine, and the discharged brine from the turbine at a reduced pressure of 130 psig., and at 170° F., is fed to a flash drum, flashing off additional isobutane dissolved and entrained in the brine, and such flashed isobutane is introduced into the condenser as at 34, of the basic direct contact heat exchange system.

The resulting brine is then introduced first through the bottom of a stripper in indirect heat exchange contact with the lower portion of the stripper, and is then introduced into the top of the stripper. Wellhead brine at 340° F., is introduced directly into the lower portion of the stripper. A mixture of steam and isobutane at about 130° F., is recovered as overhead from the stripper and is condensed, the noncondensed isobutane gas being pumped up to the pressure (130 psig.) in the condenser in the basic direct contact heat exchange system, as at 34 in FIG. 1, and is introduced into such condenser. The brine discharged from the stripper is mixed with the condensed steam in the overhead from the stripper, and is discarded. The isobutene content of the brine discharged from the stripper is 1 ppm or less, which is not practically recoverable, and thus such spent brine is considered to be substantially free of working fluid.

In another example of operation, the brine in the stripping column of the third stage of the recovery process and system is cooled from 150° F., to 130° F., and so generates steam in the column which is at 110° F., without requiring introduction of additional heat to the stripping column.

It will be understood that if the brine or water leaving the direct contact heat exchange column at 20 in FIG. 1 is not at sufficiently high pressure, the expander or power recovery turbine such as at 64 in FIG. 2 is omitted, prior to introduction of the brine into the second stage flash drum at 68.

From the foregoing, it is seen that the invention provides an economical process and system for efficient recovery of working fluid from geothermal brine or other hot water containing sources employed in direct contact heat exchange for recovery of energy, comprising a unique combination of steps or operations, in which a portion of the working fluid dissolved and/or entrained in such brine or water is removed in successive increments, in such a manner that following the last step or stage or working fluid removal, the discharged brine or hot water is substantially free of working fluid, or the amount thereof remaining in the spent brine or water is so small as to be commercially non-recoverable. This combination of steps in the order set forth above has been found most efficient for readily and economically removing substantially all of the working fluid from the spent brine or water due to the fact that in the first step liquid and relatively high pressure working fluid are recovered which requires only a small amount of energy to reintroduce the working fluid into the main working fluid stream as shown in FIG. 1, in the second step working fluid in gaseous form and at a somewhat lower pressure is reintroduced into the main working fluid stream, and in the third step working fluid at a lower pressure than in the second step is then reintroduced into the main working fluid stream. The overall effect of this combination of steps is the recovery of most or substantially all of the working fluid in the brine or water recovered from the direct contact heat exchanger at a minimum or optimum expenditure of energy.

While I have described particular embodiments of my invention for purposes of illustration, it will be understood that various changes and modifications within the spirit of the invention can be made, and the invention is not to be taken as limited sxcept by the scope of the appended claims.

What is claimed is:

1. In a system for recovery of energy from hot water-containing fluids including geothermal brine and other hot water-containing sources, said system comprising heat exchange column means for direct contact heat exchange between said hot water-containing fluid and an immiscible working fluid, to produce a heated working fluid and a cooled aqueous liquid-containing working fluid, means for expanding the resulting heated working fluid to produce work, condenser means for condensing the expanded working fluid, means for returning the condensed working fluid to said heat exchange column means and means for withdrawing said cooled liquid from said column means, the improvement which comprises in combination,
    (a) settling means communicating with said heat exchange column means for settling said cooled liquid withdrawn from said column means, to separate some of said working fluid from said liquid,
    (b) flash means communicating with said settling means for flashing said separated cooled liquid from step (a) to flash off additional working fluid and to further reduce the content of working fluid in said cooled liquid,
    (c) stripping column means communicating with said flash means for steam stripping said cooled and flashed liquid to still further reduce the content of working fluid therein,
    (d) heat transfer coil means in the bottom portion of said stripping column means for conducting cooled liquid through said coil means,
    (e) means for conducting the cooled liquid exiting said coil means onto the top of said stripping column means, and
    (f) means for introducing wellhead brine or steam into the bottom portion of said steam stripping column means.

2. A process for recovery of energy from hot water-containing fluids including geothermal brine and other hot water-containing sources, by introducing said hot water-containing fluid into a heat exchange column in direct heat exchange relation with an immiscible working fluid in liquid form to produce a heated working fluid and a cooled water-containing liquid containing working fluid, expanding the resulting heated working fluid to produce work, condensing the expanded working fluid in a condenser, returning the condensed working fluid to said heat exchange column, and withdrawing cooled water-containing liquid, containing working fluid, from said heat exchange column, the improvement in the recovery of working fluid contained in said cooled water-containing liquid which comprises carrying out, in the following order, the steps of
    (a) settling said cooled water-containing liquid to separate some of said working fluid from said cooled water-containing liquid and thereby reduce the amount of working fluid contained in said water-containing liquid,
    (b) recycling said separated working fluid of step (a), in liquid form, directly to said heat exchange column,
    (c) flashing the separated water-containing liquid of step (a) to flash off additional working fluid and further reduce the amount of working fluid contained in said water-containing liquid,
    (d) adjusting the pressure of the flashed working fluid to approximately the pressure of the condenser,
    (e) recycling said adjusted working fluid to the condenser,
    (f) steam stripping the flashed water-containing liquid of step (c) by employing the heat of said water-containing liquid of step (c), hot wellhead brine, steam or other heat source to provide the required heat for said steam stripping, to thereby drive off, as a mixture, additional working fluid and steam and still further reduce the amount of working fluid contained in said water-containing liquid,
    (g) condensing the steam in said mixture and recovering the working fluid from said condensed steam,
    (h) pumping up the pressure of said recovered working fluid of step (g) to a pressure approximately equal to the pressure of the condenser, and
    (i) recycling said pumped up working fluid to said condenser.

3. The process as defined in claim 2, including reducing the pressure during said settling step to lower the solubility of said working fluid in said cooled water-containing liquid, and further including work expanding the cooled water-containing liquid between the settling and flashing steps.

4. The process as defined in claim 2, wherein the hot water-containing fluid is geothermal brine and said working fluid is isobutane.

5. In a system for recovery of energy from hot water-containing fluids including geothermal brine and other hot water-containing sources, said system comprising heat exchange column means for direct contact heat exchange between said hot water-containing fluid and an immiscible working fluid, to produce a heated working fluid and a cooled aqueous liquid containing working fluid, means for expanding the resulting heated working fluid to produce work, condenser means for condensing the expanded working fluid, means for returning the condensed working fluid to said heat exchange column means, and means for withdrawing said cooled liquid from said column means, the improvement which comprises in combination,
    (a) a settling tank communicating with said heat exchange column means for settling said cooled liquid withdrawn from said column means, to separate some of said working fluid as liquid from said cooled liquid,
    (b) a flash drum, (c) means for introducing the cooled liquid from said settling tank into said drum for flashing said separated cooled liquid to flash off additional working fluid,
(d) a steam stripping column,
(e) a heat exchange coil in the bottom portion of said stripping column,
(f) means for conducting cooled and flashed liquid from said flash drum through said coil,
(g) means for introducing the liquid containing remaining working fluid from said coil into the top of said stripping column, to form a mixture of steam and working fluid,
(h) a cooler communicating with said steam stripping column for condensing steam from said mixture of steam and working fluid from said steam stripping column,
(i) first conduit means for conducting liquid working fluid separated in said settling tank (a) to said heat exchange column means,
(j) second conduit means for conducting working fluid flashed off in said flash drum (b) to said condenser means,
(k) third conduit means for conducting working fluid from said cooler (b) to said condensing means, and
(l) a pump in said last-mentioned conduit for increasing the pressure of the working fluid therein to the pressure in said condensing means.

6. The system as defined in claim 5, including means for reducing the pressure of said cooled liquid prior to introduction thereof into said settling tank, an expander between said settling tank and said flash drum for expanding the cooled liquid withdrawn from said settling tank, and means for introducing wellhead brine or steam into the bottom of said steam stripping column.

* * * * *